June 8, 1926.

W. T. SIMPSON 1,587,609

LIQUID FEED FORCING APPLIANCE

Filed Oct. 21, 1920

Inventor:
Ward T. Simpson,
by Spear, Middleton, Donaldson & Hall
Attys.

Patented June 8, 1926.

1,587,609

UNITED STATES PATENT OFFICE.

WARD T. SIMPSON, OF ANN ARBOR, MICHIGAN.

LIQUID-FEED-FORCING APPLIANCE.

Application filed October 21, 1920. Serial No. 418,416.

It is the object of my invention to provide means whereby a liquid may be forced to a desired point, such as oil in a lubricating system, without the use of a cylinder and piston, usually employed, by utilizing the power derived from the suction and compression in the cylinder of the engine or compressor, to act directly upon the liquid to be forced to the points of delivery or the parts to be lubricated.

Other objects of the invention will be clear from the following description and the scope of the invention will be defined in the appended claims, it being understood that the drawing, together with the description, is to be regarded as illustrative of one form of my invention and not as restrictive upon its scope.

The drawing shows in Figure 1 a central sectional view of the invention which may be applied as a force feed unit of a lubricating system for automobiles, or in other situations and for other uses.

Figure 1:
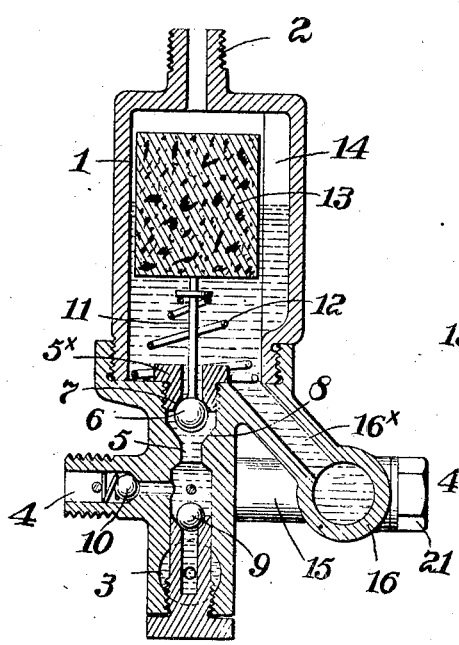
Figure 2:
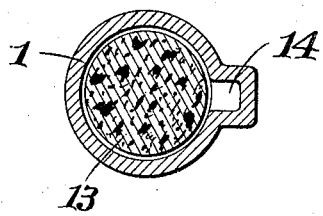
Fig. 2 is a detail view.

Referring to Figs. 1 and 2, the numeral 1 indicates a chamber having a pipe 2 leading thereto by which the interior of the chamber is subjected to pulsations from the combustion chamber or compression space of an automobile engine or a cylinder of a compressor or other engine.

3 is a pipe for supplying the liquid, for instance oil, from a suitable reservoir, and 4 is a delivery pipe by which the liquid is conveyed from the device to the point where it is to be delivered.

These two pipes connect with the branch 5 which is in communication with the lower part of the chamber, as shown. In this branch there is a valve or plunger 6. In the present instance this is in the form of a ball adapted to fit an upper seat 7 and a lower seat 8 controlling the flow of the liquid to and from the chamber. For this purpose the ball or plunger works in the space between the two seats and when the plunger is passing from one seat to the other, the liquid may flow past the plunger or ball on all sides thereof to or from the chamber, as the case may be.

The supply pipe is furnished with a check valve 9 closing towards the supply reservoir, and the delivery pipe is provided with a check valve 10 closing towards the branch 5.

The plunger or ball valve is carried by a stem 11, pressed normally upwardly by a spring 12 seated on the bottom of the chamber and connected at its upper end with the stem. There is a float member 13 within the chamber adapted to bear on the upper end of the valve stem, and, preferably, this float member is not attached to the stem but can have movement independent thereof. The float does not fit the chamber tightly and at one side there is a channel 14 for the passage of the liquid alongside of the float, the purpose of this construction being to eliminate the undue rise or creeping of the liquid due to capillary attraction and to allow the liquid to be influenced promptly and freely by the pulsations from the compression chamber of the engine.

In the operation of the device, by the pulsations from the engine cylinder, i. e., the suction and compression following each other in rapid succession, the plunger or ball valve will be in rapid reciprocation between its two seats. On the suction stroke it will raise, but during its movement from its lower to its upper seat it will permit the liquid to be drawn past it from the supply pipe and into the force feed chamber, it being understood that check valve 10 will now be closed and the check valve 9 will be open. On the compression stroke of the engine piston the liquid will be placed under pressure and the plunger 6 will be forced from its upper to its lower seat, but as soon as it leaves its upper seat and until it reaches its lower seat, the liquid will be forced past it and into the delivery pipe from the chamber 1, check valve 10 now being open and check valve 9 closed. This pressure from the engine cylinder as well as the suction mentioned above, acts directly on the liquid and no piston is employed, such as in a pump of ordinary form, and at each cycle of operation a substantially definite or predetermined amount of oil is drawn into the chamber from the supply and a substantially equal amount is forced out of the chamber and through the delivery pipe, so that a prescribed charge of oil is delivered to the parts to be lubricated for each reciprocation of the engine or compressor piston.

So long as the supply and delivery of the oil to and from the chamber 1 are equal and, as a consequence, the level of the oil in said chamber is maintained, the float will be practically out of service, it remaining floating above the stem of the valve without having any effect thereon, but should the supply of oil flowing in from the supply pipe 3 become reduced from any cause, then the level of the liquid in the chamber 1 will fall, due to the discharge of liquid from the chamber exceeding the supply, and the float will fall and contact with the valve and stem and load the same so that the movement of the valve will be either reduced or will practically cease, and the valve will then gravitate to its lower seat and will prevent the compression strokes from clearing the oil delivery pipe and blowing out through said pipe and reducing the power of the engine on account of losing a part of its compression. This condition will continue until the supply pipe opens up and permits the suction stroke of the engine to draw through from the reservoir, and again build up the supply in the chamber to the point where the float is buoyed up again.

If, on the other hand, the outlet pipe becomes stopped, the suction strokes will draw in the liquid and buoy up the float, relieve the spring and allow it to seat the plunger and prevent the engine from drawing liquid into its own compression chamber, and this condition will continue until the delivery pipe has opened or partly opened, the ball valve remaining on its upper seat and preventing any liquid being drawn into the chamber and thence to the engine.

In my device there is no piston for pumping the liquid, but the pulsations from the engine act directly on the liquid itself.

With a piston, under slow movement, leakage past the piston is liable to take place and thus the piston arrangement is of low efficiency at slow speeds. This, however, is not so with my device.

The passages at the top of the force feed chamber are small, in order to get effective action with small power.

Figure 3:
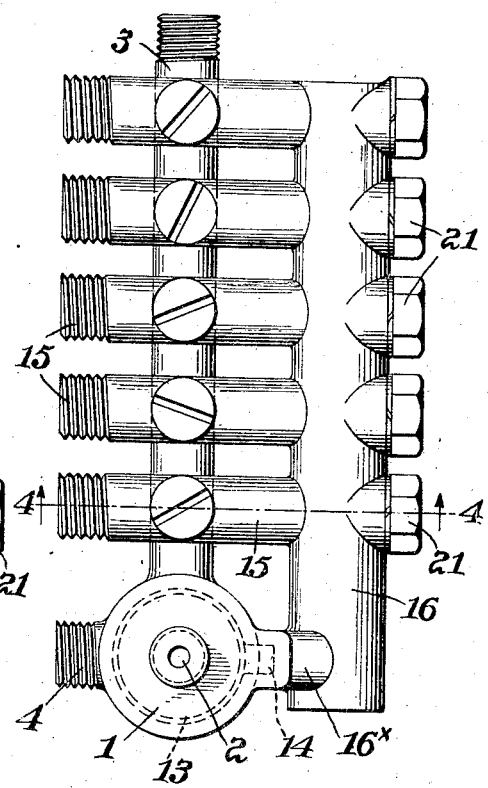
Fig. 3 is a plan view of the invention combined with a fitting whereby a plurality of connections may cooperate with the force feed chamber.
Figure 4:
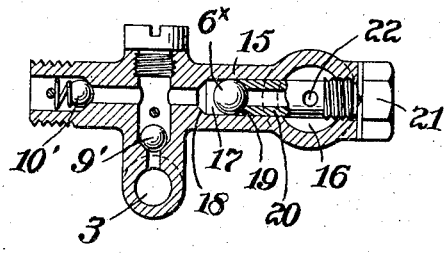
Fig. 4 is a sectional view on line 4—4 of Fig. 3.

I show in Figs. 3 and 4 a development of the invention for supplying liquid to a number of delivery points. A suitable frame has a number of branches 15 to supply different parts of the system. Each of these branches is supplied with oil from the main supply pipe 3. and there is a check valve 9' between each branch pipe and the supply pipe closing towards the supply pipe, and there is also a check valve 10' at the discharge end of each branch 15.

Each of these branch pipes communicates with a passage 16 connected by a branch 16ˣ with the interior of the force feed chamber, and there is a plunger or ball 6ˣ operating in a pocket 17 in each branch 15, said pocket having a seat 18 and a second seat 19, the latter being on the end of a tube 20 screw threaded into the fitting or casing and having a head 21 by which it may be turned. This pipe communicates with the passage 16 through an opening 22, it being understood that there is one of these tubes in each branch 15.

The pulsations from the compression space of the motor acting directly on the liquid in the force feed chamber will, on the compression stroke, exert pressure on the oil in passages 16ˣ and 16, and the plungers or balls 6ˣ under normal conditions all will be unseated at 19 and during the time they are passing from seat 19 to seat 18 there will be discharge of oil from the branches 15. When the valve or plunger reaches the seat 18, further discharge will cease.

During this discharging action all of the inlet check valves 9' will be closed.

On the suction stroke the suction will be exerted on the liquid in the chamber 1 and consequently on the liquid in passage 16, which is in free communication with chamber 1 and hence oil will be drawn in through all the check valves in the inlet line into the various branches 15, as well as into the main chamber, but this sucking in of the liquid will go on only while the plungers or ball valves are passing from the seat 18 to the seat 19, so that a limited amount of oil will be drawn in and this will be discharged at the next compression stroke.

The plunger seats may be changed so as to give different lengths of movement to the plungers for varying the feed of oil. Thus the branch connection 5 may be provided with a removable member 5ˣ having a seat for the plunger, so that by removing this seat member and replacing it with another of different length, the seats for the plunger may be located closer together or farther apart to get different quantities of oil past the plunger at each movement.

This adjustment is also true of the seats for the plungers or balls 6ˣ. Here one seat is on the removable tube 20, which may be replaced by another tube of different length.

The force feed chamber cooperates with the several branches as a compensating or controlling means therefor. If, for instance, any one of the plungers allows too much liquid to pass it on the suction stroke, this excess will raise the level of liquid in the float chamber and the float will raise and the main plunger will raise and cut off its own supply by the action of the spring as well as the suction, and then on the compression stroke this charge will be forced out from the chamber. If, on the other hand, any one of the plungers leaks when on its seat 18 and thus causes the level of the liquid in the chamber 1 to lower or tend to lower, the main plunger will be depressed by the weight of the float and will prevent the full discharge of oil into the discharge passage 4. Any branch 15 which may have a leak or go out of service will not prevent the other branches or the main chamber 1 from operating.

The device shown in Fig. 1 is a unit complete in itself and may be used either with or without the other parts shown in Figs. 3 and 4.

I claim:—

1. A force feed appliance for liquids comprising a lubricant holding chamber having a connection to receive pulsations directly upon the body of lubricant from the compression space of an engine cylinder, an inlet and an outlet for liquid connected with the said chamber, and controlling means whereby a limited quantity of oil is drawn into the said chamber from the inlet pipe on the suction stroke and is discharged therefrom into the outlet pipe on the compression stroke by the direct action of the said pulsations on the liquid, substantially as described.

2. In combination, a chamber having means of communication at its one end with the compression space of an engine, a liquid supply pipe, a discharge pipe, a branch connecting said pipes with the other end of the chamber, check valves in the supply and discharge pipes, a plunger in the branch connection, an upper and a lower seat therefor spaced apart so that the plunger may move from one seat to the other from the pulsations acting directly on the body of liquid in said chamber, the liquid passing said plunger as it is moving from one seat to the other to flow into or out of said chamber, substantially as described.

3. In combination, a chamber having a connection leading to the compression space of the engine, a supply and discharge conduit with check valves therein, a branch conduit connecting the supply and discharge conduits with the chamber, a plunger working in said branch conduit, seats therefor, the plunger when on the upper seat preventing inlet of liquid to the chamber and when on the lower seat preventing outlet of liquid therefrom, and during its movement from seat to seat allowing the liquid to pass it into the chamber on the suction stroke of the engine and out from the chamber during the compression stroke, a spring for pressing the plunger normally upwardly and a float in the chamber for acting on the plunger by imposing its load thereon when the level of the liquid falls in said chamber.

4. In combination, a chamber having a connection with the compression space of the engine, a liquid supply and discharge conduit with means between the same and said chamber for delivering into said chamber a limited amount of liquid at each suction stroke and discharging therefrom a limited amount at each compression stroke of the engine, a branch connected with the inlet conduit with a check valve closing towards the said inlet conduit and a check valve to permit discharge from said branch, a passage connecting the said branch with the said chamber, and a plunger controlling the passage of liquid between said branch and the said passage, and two seats for the plunger, the passage of liquid being prevented towards the chamber when the plunger is on one seat and from the said chamber when the plunger is on the other seat, but allowing liquid to pass when the plunger is passing from one seat to the other, the liquid in said passage and in the said chamber being directly subjected to the action of the suction and compression from the engine thereon.

5. In combination in a force feed for liquids comprising a chamber, an inlet and an outlet conduit, check valves therein, a plunger between said check valves and the chamber, movable between two seats by the suction and compression on the liquid from the compresion space of an engine, said plunger permitting the passage of liquid by it when moving from one seat to the other, substantially as described.

6. In combination in a force feed for liquids comprising a chamber, an inlet and an outlet conduit, check valves therein, a plunger between said check valves and the chamber, movable between two seats by the suction and compression on the liquid from the compression space of an engine, said plunger permitting the passage of liquid by it when moving from one seat to the other, and a branch connected with the supply pipe and with the said chamber and having also an outlet, check valves at the supply and discharge openings of said branch and a plunger between the said branch and the said chamber to shut off the passage of liquid when at the limit of its movement in either direction, but permitting the passage of liquid when it is in an intermediate position, substantally as described.

7. In combination, a chamber having communication with the compression space of an engine, an inlet and an outlet conduit for liquid, a branch conduit between said inlet and outlet conduits and the chamber, check valves, a plunger operating in the branch, two seats for said plunger whereby the inlet of liquid to and its discharge from the chamber is controlled, but liquid is adapted to pass the plunger when intermediate of the seats, a float in the chamber for loading the plunger when the level of liquid falls in the chamber and a by-pass between the opposite ends of the chamber past the float, substantially as described.

8. In combination, a lubricant chamber having a communication with the compression space of an engine to receive pulsations directly therefrom, upon its contained oil, a port at said chamber serving as an inlet and as an outlet for lubricant to and from the same and means operated by the pulsations from the compression space upon the lubricant in said chamber to control the inlet and discharge of lubricant to and from said chamber, substantially as described.

9. In combination, a chamber for holding lubricant having a connection to the combustion space of an engine for subjecting the body of lubricant to the pulsations in said combustion space, a connection for supplying said chamber with the lubricant, and a conduit for delivering lubricant from said chamber, and controlling means for the inlet of lubricant from said supply connection and for the discharge of lubricant to said conduit operated by the variations in pressure upon the body of lubricant in said chamber.

In testimony whereof I affix my signature.

WARD T. SIMPSON.